United States Patent
Gelin

(10) Patent No.: US 10,731,783 B2
(45) Date of Patent: Aug. 4, 2020

(54) CONNECTION DEVICE FOR CONNECTING TWO FLUID CIRCUITS

(71) Applicant: GAZTRANSPORT ET TECHNIGAZ, Saint Remy les Chevreuse (FR)

(72) Inventor: Guillaume Gelin, Orsay (FR)

(73) Assignee: GAZTRANSPORT ET TECHNIGAZ, Saint Remy les Chevreuse (FR)

(*) Notice: Subject to any disclaimer, the term of this patent is extended or adjusted under 35 U.S.C. 154(b) by 0 days.

(21) Appl. No.: 15/114,901

(22) PCT Filed: Jan. 29, 2015

(86) PCT No.: PCT/EP2015/051841
§ 371 (c)(1),
(2) Date: Jul. 28, 2016

(87) PCT Pub. No.: WO2015/114058
PCT Pub. Date: Aug. 6, 2015

(65) Prior Publication Data
US 2016/0356410 A1    Dec. 8, 2016

(30) Foreign Application Priority Data
Feb. 3, 2014  (FR) ...................................... 14 50821

(51) Int. Cl.
*F16L 37/36*  (2006.01)
*F16L 37/248*  (2006.01)
(Continued)

(52) U.S. Cl.
CPC ............... *F16L 37/36* (2013.01); *B67D 9/00* (2013.01); *F16L 37/248* (2013.01); *F16L 37/252* (2013.01)

(58) Field of Classification Search
CPC . F16L 37/30; F16L 37/32; F16L 37/36; F16L 37/248; F16L 37/252; B67D 9/00; B67D 9/02; B63B 27/24; B63B 27/25
See application file for complete search history.

(56) References Cited

U.S. PATENT DOCUMENTS 3,896,841 A * 7/1975 Bahlke ..................... B63B 27/24
                                                          137/271
4,826,354 A    5/1989 Adorjan
(Continued)

FOREIGN PATENT DOCUMENTS

| DE | 102012209629 A1 | 12/2013 |
| FR | 2311989 A2 | 12/1976 |
| WO | 8201929 A1 | 6/1982 |

*Primary Examiner* — Andrew D Stclair
(74) *Attorney, Agent, or Firm* — Notaro, Michalos & Zaccaria P.C.

(57) ABSTRACT

Connection device for connecting two fluid circuits having two connectors, each designed to be mounted on one of the circuits, wherein each connector has a fluid conduit designed to cooperate with the conduit of the other connector to form a fluid passage between the connectors, a first valve and a second valve located in the conduit and capable of selectively sealing or opening the conduit, wherein the conduit has a buffer space defined by an inner wall of the fluid conduit, the first valve and the second valve, a first actuator of the first valve and a second actuator of the second valve the connection device further having a coupling element capable of sealingly coupling the conduits of the connectors.

12 Claims, 4 Drawing Sheets

(51) Int. Cl.
    *B67D 9/00*         (2010.01)
    *F16L 37/252*     (2006.01)

(56) References Cited

U.S. PATENT DOCUMENTS

| | | | | |
|---|---|---|---|---|
| 4,986,304 | A * | 1/1991 | Vanderjagt | F16L 37/107 137/614.02 |
| 5,009,252 | A * | 4/1991 | Faughn | F16L 37/113 137/614.04 |
| 5,092,363 | A * | 3/1992 | Vanderjagt | F16L 37/107 137/614.02 |
| 5,168,897 | A * | 12/1992 | Vanderjagt | F16L 37/107 137/614.02 |
| 5,257,653 | A * | 11/1993 | Nimberger | F16L 37/32 137/498 |
| 5,316,033 | A * | 5/1994 | Schumacher | F16L 37/23 137/614 |
| 6,125,871 | A * | 10/2000 | Drab | B08B 9/021 134/113 |
| 2005/0103387 | A1 | 5/2005 | Voege et al. | |
| 2010/0147398 | A1 * | 6/2010 | Thomas | B63B 27/24 137/315.01 |
| 2010/0263389 | A1 | 10/2010 | Bryngelson et al. | |
| 2013/0146146 | A1 | 6/2013 | Sethre | |

\* cited by examiner

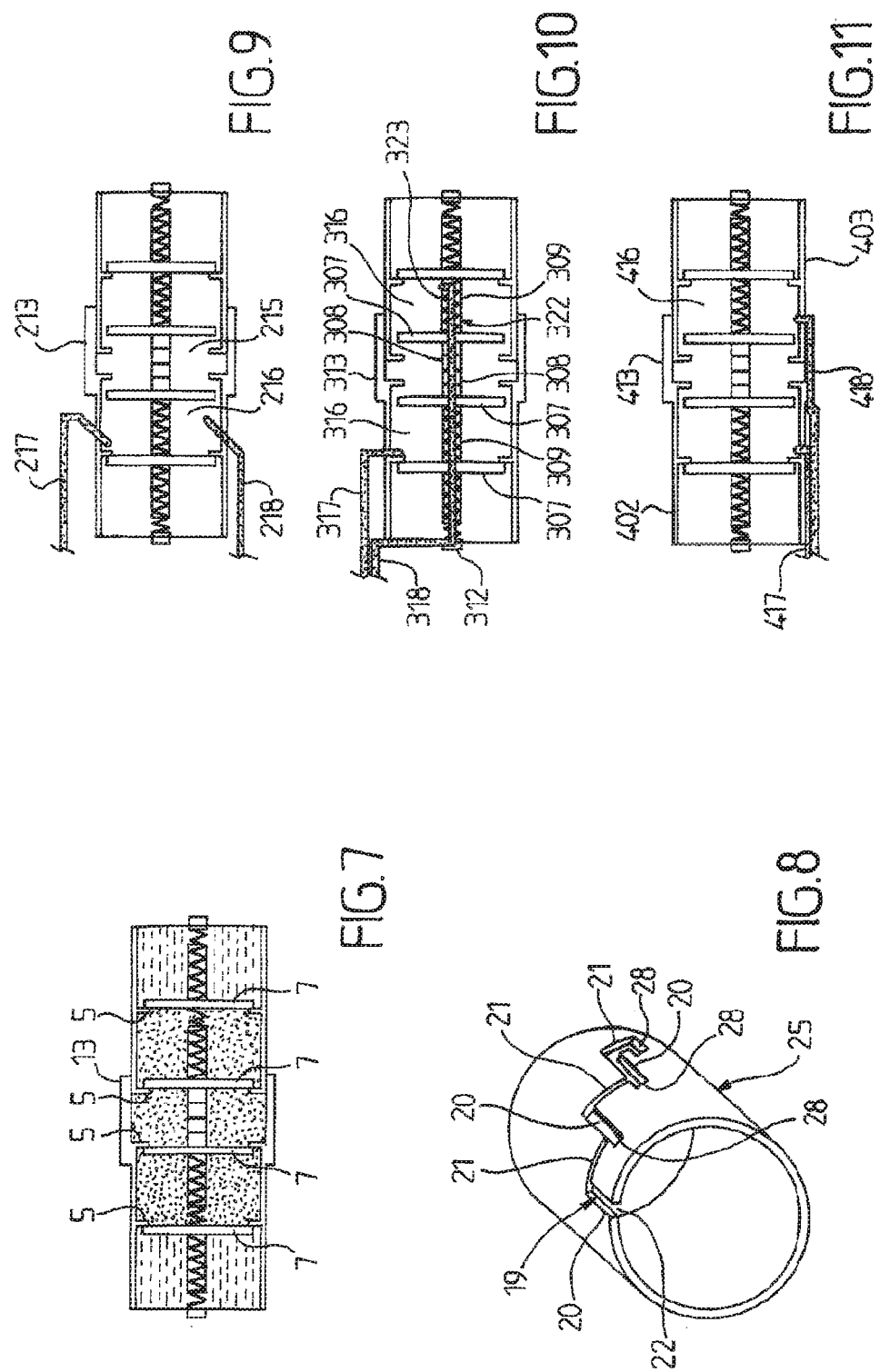

CONNECTION DEVICE FOR CONNECTING TWO FLUID CIRCUITS

TECHNICAL FIELD

The invention relates to the field of connection devices for connecting two circuits of dangerous fluid. The invention relates more specifically to connection/disconnection elements permitting a conduit filled with liquefied natural gas (LNG) to be connected and disconnected without the risk of an explosive or dangerous atmosphere being generated.

TECHNOLOGICAL BACKGROUND

The transfer of LNG is carried out by means of pipes, in particular flexible pipes. Each pipe comprises a connector which is designed to cooperate with the connector of the other pipe. The connection of two connectors forms a sealed passage between the pipes, thus permitting the transfer of fluid.

The vaporization of LNG in the case of leakage requires the use of a connection device having a high degree of security for the transfer of fluid. In particular, it is important to avoid an explosive atmosphere being formed in the case of leakage from the closing members, including during the connection or the disconnection procedure.

The document US2005/0103387 discloses a connection device comprising a male connector and a female connector. The document U.S. Pat. No. 4,826,354 discloses an underwater pipeline for the transfer of LNG.

SUMMARY

According to one embodiment, the invention provides a connection device for connecting two fluid circuits, the connection device comprising a first connector designed to be mounted on a first fluid circuit and a second connector designed to be mounted on a second fluid circuit, wherein each connector comprises:
  a fluid conduit having a first end designed to be mounted on the fluid circuit and a second end designed to cooperate with the second end of the conduit of the other connector to form a fluid passage between the first connector and the second connector,
  a first valve located in the fluid conduit and capable of selectively sealing or opening an internal space of the fluid conduit,
  a second valve located in the fluid conduit between the first valve and the first end of the connector and capable of selectively sealing or opening the internal space of the pipe,
  wherein the internal space of the fluid conduit comprises a buffer space defined by an inner wall of the fluid conduit, the first valve and the second valve,
  a first actuator capable of actuating the first valve between an open position opening the conduit and a closed position sealing the fluid conduit in a sealed manner,
  a second actuator capable of actuating the second valve between an open position opening the conduit and a closed position sealing the pipe in a sealed manner,
the connection device further comprising a coupling element capable of sealingly coupling the two connectors in a coupled position, such that the internal spaces of the fluid conduits of the two connectors are sealingly connected in the region of the second ends of the pipes and form, between the first valves of the two connectors, an inter-connector space which is sealed relative to the outside of the fluid conduits.

According to embodiments, such a connection device may comprise one or more of the following features.

According to one embodiment,
  one of the connectors comprises a flushing gas inlet discharging into the buffer space and designed to be connected to a source for supplying flushing gas and capable of injecting flushing gas into the buffer space of the connector, and
  one of the connectors comprises a gas and/or liquid outlet discharging into the buffer space and capable of evacuating the gas and/or the liquid contained in the buffer space of said connector.

According to one embodiment,
  one of the connectors comprises a flushing gas inlet discharging into the conduit between the first valve and the second end of said connector and designed to be connected to a source for supplying flushing gas and capable of injecting flushing gas into the inter-connector space, and
  one of the connectors comprises a gas and/or liquid outlet discharging into the conduit between the first valve and the second end of said connector and capable of evacuating the gas and/or the liquid contained in the inter-connector space.

According to one embodiment, the flushing gas inlet and the gas and/or liquid outlet are located on one and the same connector.

According to one embodiment, the flushing gas inlet and the gas and/or liquid outlet are located on two separate connectors.

According to one embodiment, the second actuator cooperates with the first valve for the automatic mechanical control of a closed state of the first valve with a closed state of the second valve and for the automatic mechanical control of an open state of the second valve with an open state of the first valve.

Such an automatic mechanical control may be implemented by different elements, for example by means of a plunger and restoring springs when the valves are able to be switched by translation, or even by means of gears, pinions and racks, helicoidal cams or other mechanical connecting means, in particular when at least one of the valves is able to be switched by rotation.

According to one embodiment, the connection device further comprises a locking member automatically mechanically controlled with the first valve and cooperating with the second valve for the automatic control of a closed state of the first valve with a locked state of the second valve and for the automatic control of an open state of the first valve with an unlocked state of the second valve.

According to one embodiment, the first valve of each connector comprises:
  a first valve seat fixed in the internal space of the pipe,
  a first flap valve which is mobile in translation in the direction of the fluid conduit relative to the first flap valve seat and designed to cooperate with the first flap valve seat on the side of the second end of the conduit in order to seal the fluid conduit of the connector in a sealed manner,
  a first restoring element capable of exerting a first restoring force pushing back the first flap valve against the first flap valve seat in the direction of the second end of the conduit in the absence of opposing force,
and the first actuator of each connector comprises a first activation rod protruding from one face of the first flap valve opposing the buffer space. The first activation rods of the two connectors are designed to cooperate in abutment when the connectors are moved toward one another. The abutment of the first activation rods blocks the movement of the first flap valves toward one another without preventing the movement of the connectors toward one another. This blockage of the movement of the first flap valves toward one another is carried out counter to the first restoring force of each first flap valve. Thus, in the coupled states of the two connectors, the abutment of the first activation rods maintains the first flap valves at a distance from the first flap valve seats.

According to one embodiment, the second valve of each connector comprises:
- a second flap valve seat fixed in the internal space of the fluid conduit between the first flap valve seat and the first end of the fluid conduit,
- a second flap valve which is mobile in translation in a direction of the conduit relative to the second flap valve seat and designed to cooperate with the second flap valve seat on the side of the second end of the conduit in order to seal the fluid conduit in a sealed manner,
- a second restoring element capable of exerting on the second flap valve a second restoring force pushing back the second flap valve against the second flap valve seat in the direction of the second end of the conduit in the absence of opposing force, and the second actuator of each connector comprises a second activation rod extending between the first flap valve and the second flap valve, the second activation rod of each connector being designed to transmit the displacement of the first flap valve to the second flap valve in order to push back the second flap valve against the second restoring force of the second flap valve in response to the displacement of the first flap valve when the two connectors are moved toward one another in order to couple said connectors such that, in a fully connected position of the two connectors, the thrust of the second activation rods on an internal face of the second flap valves opposite the first flap valves maintains the second flap valves at a distance from the second flap valve seats.

According to one embodiment, the connection device further comprises a blocking mechanism capable of blocking the relative translation of the connectors, on the one hand, in the fully connected position and, on the other hand, in an intermediate connected position, the intermediate connected position being located between a disconnected position and the fully connected position, the disconnected position corresponding to a position in which the connectors are unconnected and the valves of each connector are closed, the intermediate connected position being characterized by:
- the fluid conduits being sealingly connected to one another,
- the first valves of each connector being open such that the buffer spaces of the two connectors are in communication with one another,
- the second valves of each connector being closed and sealing the fluid conduits.

According to one embodiment, the blocking mechanism is also capable of blocking the relative translation of the connectors in a pre-connected position located between the disconnected position and the intermediate connected position, the pre-connected position being characterized in that the connectors are sealingly connected to one another and the first and second valves of each connector are closed.

According to one embodiment, the mechanism for blocking the relative translation of the connectors comprises:
- a cylindrical ring, for example mounted freely in rotation, on the conduit of the first connector, the ring being provided with a groove,
- a lug which is complementary to the groove, fixed to the second connector, for example located on an external lateral face of the conduit of the second connector, and the groove comprises:
- an insertion section, one first end thereof forming an opening of the groove on a portion of the ring, the opening of the groove being designed to receive the lug, the insertion section extending in a direction which is not transverse to the direction of the fluid conduit of the first connector,
- optionally, a first blocking section extending in a circumferential direction of the fluid conduit of the first connector from the insertion section, the first blocking section being designed to block the movement in translation of the connectors toward one another in the pre-connected position,
- optionally, a first connecting section extending in a direction which is not transverse to the direction of the fluid conduit of the first connector from the first blocking section,
- a second blocking section extending in a circumferential direction of the fluid conduit of the first connector from the first connecting section or from the insertion section, if the first sections above are dispensed with, the second blocking section being designed to block the movement in translation of the connectors toward one another in the intermediate connected position,
- a second connecting section extending in a direction which is not transverse to the direction of the fluid conduit of the first connector from the second blocking section,
- a coupling section extending in a circumferential direction of the fluid conduit of the first connector from the second connecting section, the coupling section being designed to block the connectors in a fully connected coupled position.

According to one embodiment, the invention further provides a transfer system for a fluid product, the system comprising a marine vessel, a first pipeline and a second pipeline connected together by a connection device as set forth above, the pipelines being arranged so as to connect a tank installed in a hull of the marine vessel to an offshore or land-based storage installation. In one embodiment, the transfer system comprises a pump to drive a flow of cold liquid product through the insulated pipelines from or to the offshore or land-based storage installation or from the tank of the marine vessel.

According to one embodiment, the invention further provides a use of the connection device as set forth above to connect two pipelines, each comprising a connector of the connection device, wherein:
- the two fluid conduits are coupled in a coupled position in which the internal spaces of the fluid conduits of the two connectors are connected in the region of the second ends of the pipes so as to form a sealed passage between the fluid conduits of the two connectors,
- the first valve of the first connector is opened so as to open the internal space of the fluid conduit of the first connector,
- the first valve of the second connector is opened so as to open the internal space of the fluid conduit of the second connector, the second valve of the first connector is opened so as to open the internal space of the fluid conduit of the first connector, the second valve of the second connector is opened to as to open the internal space of the fluid conduit of the second connector.

According to one embodiment, the opening of the first valves is simultaneous in the two connectors.

According to one embodiment, the opening of the second valves is simultaneous in the two connectors.

According to one embodiment, the use further comprises, between the opening of the first valves of the two connectors and the opening of the second valves of the two connectors:
the opening of the flushing gas inlet,
the opening of the gas and/or liquid outlet,
the injection of flushing gas into the buffer spaces of the two connectors and into the sealed passage via the flushing gas inlet,
the simultaneous evacuation of the gas contained in the buffer spaces of the two connectors and in the inter-connector space via the gas outlet so as to fill the flushing gas into the entire space between the second valves.

According to one embodiment, the invention further provides a use for disconnecting two pipelines, each comprising a connector of the connection device, wherein:
the second valve of a first connector is closed in order to seal the fluid conduit of the first connector,
the second valve of a second connector is closed in order to seal the fluid conduit of the second connector,
the first valve of the first connector is closed in order to seal the fluid conduit of the first connector,
the first valve of the second connector is closed in order to seal the fluid conduit of the second connector,
the second ends of the fluid conduits are separated.

According to one embodiment, the closure of the first valves is simultaneous in the two connectors. According to one embodiment, the closure of the second valve is simultaneous in the two connectors.

According to one embodiment, the use further comprises, between the closure of the first valves of the two connectors and the separation of the second ends of the pipes of the two connectors:
the opening of the flushing gas inlet;
the opening of the gas and/or liquid outlet;
the injection of flushing gas into the buffer spaces of the two connectors and into the inter-connector space via the flushing gas inlet,
the simultaneous evacuation of the gas contained in the buffer spaces of the two connectors and in the inter-connector space via the gas outlet so as to fill flushing gas into the entire space between the second valves.

Certain features of the invention are based on the idea of improving the level of security of the connection between two pipelines serving for the transfer of dangerous fluid.

Certain features of the invention are based on the idea of improving the speed of connection/disconnection of the conduit connectors. Certain features of the invention are based on the idea of draining, reheating and inactivating only one small portion of the transfer system. Certain features of the invention are based on the idea of carrying out these operations in the region of a defined buffer space in the connectors.

Certain features of the invention are based on the idea of permitting the safe disconnection of the pipes filled with dangerous liquid. Certain features are based on the idea of preventing a flow of LNG and thus the creation of an explosive atmosphere during the connection and disconnection. Certain features of the invention are based on the idea of creating a dual segregation which isolates the methane in the liquid and/or gaseous phase of the air.

BRIEF DESCRIPTION OF THE FIGURES

The invention will be understood more clearly, and further objects, details, features and advantages thereof will appear more clearly during the following description of several particular embodiments of the invention provided solely by way of illustration and in a non-limiting manner, with reference to the accompanying drawings.

FIGS. 6 to 7 are schematic sectional views of the connection device of FIGS. 1 to 5 in different positions when disconnecting the connectors.

FIG. 8 is a schematic perspective view of an embodiment of a female element of a mechanism for blocking in translation which is able to be used in the connectors.

FIGS. 9 to 11 are schematic sectional views of variants of coupled connectors detailing the supply of flushing gas and the gas and/or liquid outlet of the buffer zone.

DETAILED DESCRIPTION OF EMBODIMENTS

Figure 1:
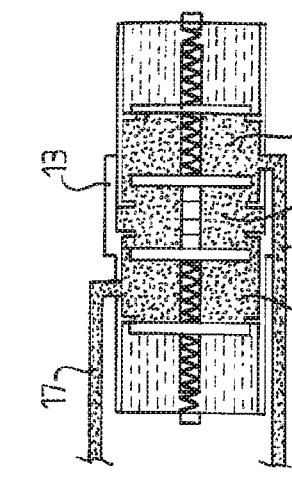
FIGS. 1 to 5 are schematic sectional views of a connection device in different positions when connecting the two connectors of a connection device.

The transfer of fluid between two installations, for example devices for storing fluid, requires the connection of two pipelines 1. Each pipeline 1 comprises a first end directly or indirectly connected in the corresponding installation and a second end designed to cooperate with the second end of the other pipeline 1. The connection between the two pipelines 1 is provided by using a connection device. This connection device comprises a connector 2 mounted at the second end of each of the pipelines 1 to be connected.

FIGS. 1 to 5 show schematically a connection device in different positions during the connection of two connectors 2, each mounted at the end of a pipeline 1.

A connector 2 comprises a hollow cylindrical casing 3. This casing 3 forms an internal conduit 4 extending the pipeline 1. The connector 2 comprises two valves permitting the conduit 4 to be sealed or opened. Each valve comprises a circular shoulder 5. Each shoulder 5 protrudes radially into the conduit 4. Each shoulder 5 extends in a plane perpendicular to a longitudinal axis 6 of the conduit 4.

Each valve also comprises a flap valve in the form of a circular plate 7. Each flap valve 7 is housed in the conduit 4. Such a flap valve 7 extends in a plane perpendicular to the longitudinal axis 6. The flap valve 7 has a diameter which is smaller than the diameter of the conduit 4 in order to permit the sliding thereof in the conduit 4 in addition to the flow of fluid when said flap valve is not in sealed contact with the shoulder 5.

The seat of the flap valve of the first valve is formed by a first shoulder 5. This first shoulder 5 is located at one end of the connector 2 opposing the pipeline 1. The flap valve of the first valve is formed by a first flap valve 7. This first flap valve 7 is housed in the conduit between the first shoulder 5 and the pipeline 1.

The seat of the flap valve of the second valve is formed by a second shoulder 5. This second shoulder 5 is located in the conduit 4 between the first shoulder 5 and the first flap valve 7. The flap valve of the second valve is formed by a second circular flap valve 7. This second flap valve 7 is housed in the conduit between the second shoulder 5 and the pipeline 1.

The first flap valve 7 comprises a first activation rod 8 on an external face. This first activation rod 8 is centered on the first flap valve 7. The flap valve 7 also comprises a second activation rod 9 on an internal face opposing the external face and opposite the second flap valve 7. This second activation rod 9 is centered on the internal face of the first flap valve 7.

A first restoring spring 10 surrounds the second activation rod 9. The second activation rod 9 forms a guide for the first spring 10. This first spring 10 is held in compression between the first flap valve and the second flap valve. The first spring 10 exerts on the first flap valve a restoring force, pushing back the first flap valve in the direction of the first shoulder 5. In reaction thereto, the first spring 10 exerts on the second flap valve 7 a pushing force in the direction of the pipeline 1.

A second restoring spring 11 is located between a fixed element 12 of the casing 3 and the second flap valve 7. Such a fixed element 12 is, for example, a stud fixed to the casing 3 and extending radially as far as the center of the conduit 4 at one end of the connector 2 joining the pipeline 1. The spring 11 surrounds a guide rod which ensures the retention of the spring 11 in the position between the fixed element 12 and the second flap valve 7. The spring 11 is held in compression between the fixed element 12 and the second flap valve 7. The spring 11 exerts a second restoring force on the second flap valve 7, pushing back the second flap valve 7 in the direction of the second shoulder 5. The spring 10 and the spring 11 are coaxial with the longitudinal axis 6 of the pipe. The restoring force exerted by the spring 11 on the second flap valve 7 is greater than the pushing force exerted by the spring 10 on the second flap valve 7 such that, in the absence of other forces, the spring 11 sealingly holds the second flap valve 7 against the second shoulder 5 and the spring 10 holds the first flap valve 7 against the first shoulder 5. The second activation rod 9 has a length which is less than the distance between the internal face of the first flap valve 7 and the second flap valve 7 in the longitudinal direction 6, i.e. a space separates the second activation rod 9 of the second flap valve 7 when the first valve and the second valve are closed.

In order to provide the sealed connection between the connectors 2 when they are coupled, a first connector comprises a cylindrical sleeve 13 having an internal diameter which is slightly greater than the external diameter of the other connector 2. The sleeve 13 is coaxial with the casing 3 of the first connector.

Figure 3:
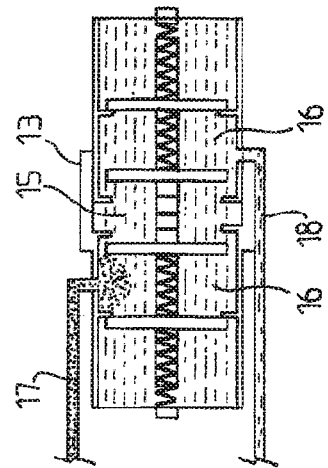

As visible in FIG. 3, the first connector 2 advantageously comprises a flushing gas inlet conduit 17. This inlet conduit 17 is connected to a source for the supply of flushing gas to carry out flushing of the space between the second valves 7 during the connecting procedure and the disconnecting procedure of the connectors 2. The inlet conduit 17 discharges into the buffer space 16 of the first connector 2.

The flushing gas used during the disconnecting procedure is an inert gas, such as nitrogen or any other suitable gas. Thus, in the disconnected state shown in FIG. 1, the inert gas permits an inert buffer to be created in the buffer space 16 between the external atmosphere and the methane, for reasons of safety. During the connecting procedure, the flushing gas used may be an inert gas or any other gas which is not incompatible with the contents of the pipelines 1, for example methane, but naturally neither air nor oxygen.

The second connector 2 comprises an evacuation conduit 18 to evacuate the gas and/or the liquid from the space between the two flap valves 7 during the connecting procedure and the disconnecting procedure of the connectors 2. This evacuation conduit 18 is connected, for example, to a device for storing gas, to a vacuum pump or even to the atmosphere. Valves 30 and 31 are preferably mounted on the pipes 17 and 18 selectively to open and close these pipes.

The connecting procedure and the disconnecting procedure of the connectors 2 is now described.

FIG. 1 shows the two connectors in a disconnected state. In the disconnected state, the springs 10 and 11 hold the flap valves 7 against the shoulders 5 in a sealed manner, i.e. the two valves are closed. The LNG contained in the pipelines 1 is thus confined in a secure manner. The first activation rod 8 protrudes outside the conduit 4. In order to be connected, the two connectors 2 are positioned coaxially opposite one another.

Figure 2:
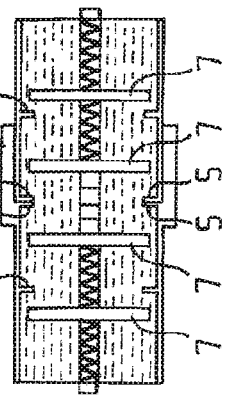

FIG. 2 shows the two connectors coupled in a pre-connected state. In order to reach the pre-connected state, the two connectors 2 of FIG. 1 are moved toward one another along the longitudinal axis 6 such that the second connector is inserted in the sleeve 13. The sleeve 13 comprises on its internal face an O-ring, not shown, which cooperates with the external surface of the second connector in order to provide the seal to the connection between the two connectors.

The sleeve 13 thus closes a sealed connecting space 15 between the first valves of the two connectors 2. The sealed closure of the connecting space 15 traps the ambient air between the connectors 2.

In the pre-connected state, the first activation rods 8 are in contact but do not exert forces counter to the springs 10. Thus, the first valves and the second valves of the two connectors remain closed.

FIG. 3 shows an intermediate connected state of the two connectors. The intermediate connected state is obtained by moving the connectors 2 of FIG. 2 toward one another along the axis 6.

The movement of the two connectors 2 toward one another from the pre-connected state shown in FIG. 2 causes the movement of the first shoulders 5 toward one another. During this movement of the two connectors toward one another, the movement of the first flap valves 7 toward one another is blocked by the abutment of the first activation rods 8 against one another. The difference in displacement between the first shoulders 5 and the first flap valves 7 opens the first valve of each connector 2. The opening of the first valves of the connectors 2 places the buffer spaces 16 of the pipes 4 located between the first valve and the second valve of each connector 2 in communication with the connecting space 15.

The blockage of the first flap valves 7 in position also blocks the second activation rods 9 in position. The second flap valves 7 held against the second shoulders 5 are displaced with the connectors 2. The second flap valves 7 thus move toward the second activation rods 9. Thus in the intermediate connected state, the second activation rods 9 just come into contact with the second flap valves 7. However, this contact is made without the second activation rods 9 exerting force on the second flap valves 7 against the springs 11. The second valves thus remain in a closed position, sealing the pipes 4 and preventing the LNG contained in the pipeline 1 from circulating between the connectors 2.

Figure 4:
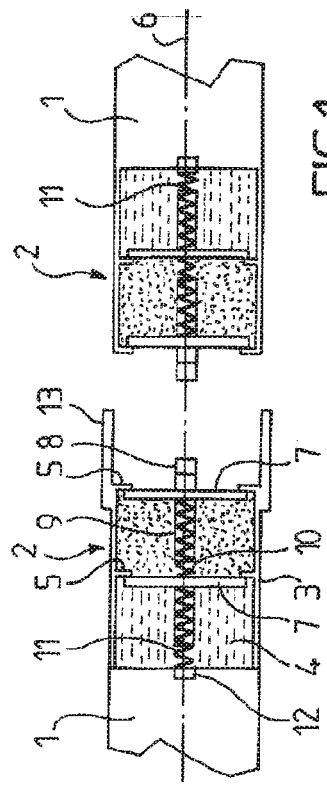

When the connectors are coupled in the intermediate connected state, a flushing gas is injected into the buffer space of the first connector 2 via the inlet conduit 17. Moreover, the evacuation conduit 18 is also open. The inlet via the conduit 17 and the simultaneous evacuation of gas via the conduit 18 permits the gas contained in these buffer spaces 16 in addition to the air trapped in the connecting space 15 to be replaced by the flushing gas as shown in FIG. 4.

When the buffer spaces 16 and the connecting space 15 contain nothing other than flushing gas, the inlet conduit 17 and the evacuation conduit 18 are closed again. Once these pipes 17, 18 are closed again, the two connectors 2 are moved toward one another once again along the longitudinal axis 6 from the intermediate connected state as far as a fully connected state shown in FIG. 5.

Figure 5:
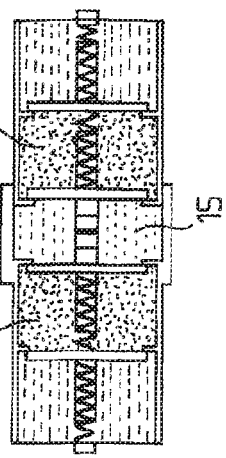

During this movement toward one another, the first activation rods 8 still prevent the movement of the first flap valves 7 toward one another, holding the first valves open. In a similar manner, the abutment of the second flap valves 7 on the second activation rods 9 blocks the displacement of the second flap valves whilst the second shoulders 5 move toward one another. The blockage of the second flap valves 7 associated with the movement of the second shoulders 5 toward one another opens the second valves of the two connectors 2. The opening of the second valves opens the pipes 4 of the two connectors such that the LNG contained in the pipelines 1 is able to flow freely from the first connector to the second connector as shown in FIG. 5.

Figure 6:
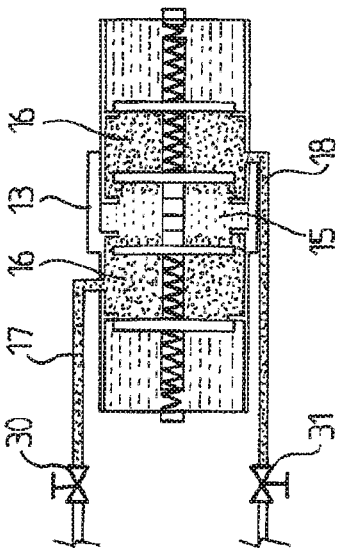

The disconnection of the connectors follows a reverse pattern to the connection pattern described above. FIGS. 6 to 7 show the different steps of disconnection of the two connectors 2 from the fully connected state as shown in FIG. 5 to the disconnected state as shown in FIG. 1.

In a first step, the connectors 2 which are connected are separated so as to pass from the connected state, i.e. all of the valves open, to the intermediate connected state, i.e. the first valves are open and the second valves are closed. During this separation, the LNG is trapped in the buffer spaces 16 and in the connecting space 15. To evacuate this LNG, flushing is carried out, as described above with regard to FIGS. 3 and 4. This flushing comprises the injection of flushing gas via the inlet conduit 17 in addition to the evacuation of the product contained in the buffer spaces 16 and in the connecting space 15 via the evacuation conduit 18. This flushing is carried out until the LNG trapped in the buffer spaces 16 and in the connecting space 15 is entirely replaced by the flushing gas. FIG. 6 shows the connectors 2 in the intermediate connected state during the flushing of trapped LNG.

Once the flushing has been carried out, the inlet conduit 17 and the evacuation conduit 18 are closed. The two connectors are thus separated, from the intermediate connected state into the pre-connected state, i.e. all of the valves closed as shown in FIG. 7.

As the connecting space 15 only comprises inert flushing gas, the connectors may be separated without the risk of inflammation to the users. Only the flushing gas is released during this disconnection.

In a variant not shown, the inlet conduit 17 and/or the evacuation conduit 18 may directly discharge into the connecting space 15 between the two connectors. For example, the pipes may both pass through the sleeve 13 and discharge into the connecting space 15. A blocking mechanism may be installed on the connectors 2 in order to lock the connectors selectively in the different functional states described above, namely an intermediate connected state, a pre-connected state and a fully connected state. Such a blocking mechanism serves, for example, in the intermediate connected state, to prevent the movement toward one another or the separation of the connectors as long as the buffer spaces and the connecting space have not been flushed.

Figure 13:
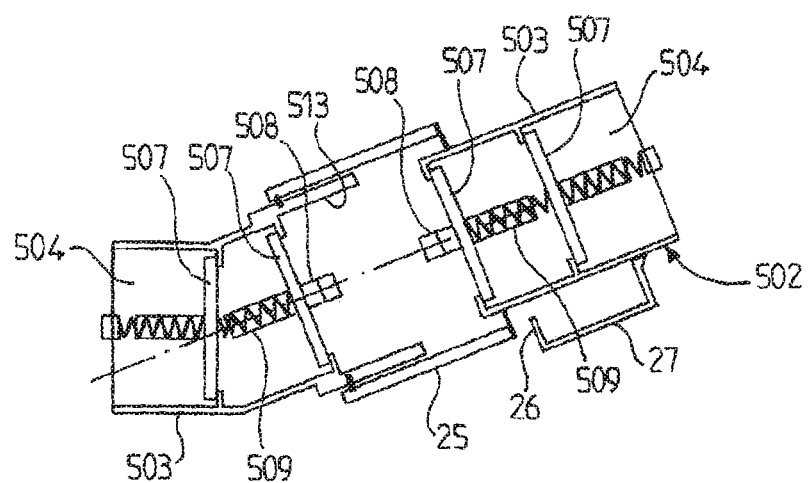
FIG. 13 is a schematic sectional view of a connection device according to a further embodiment.

FIGS. 8 and 13 show an exemplary embodiment of the blocking mechanism of the connectors. In FIG. 13, elements which are similar or identical to those of FIG. 1 bear the same reference numeral increased by 500 and will not be described again.

As visible in FIG. 13, the blocking mechanism is formed by a hollow circular cylindrical ring 25 mounted on one of the connectors and a lug 26 mounted on the other connector. This ring 25 is mounted about the sleeve 513 of the first connector 502 and protrudes beyond the sleeve 513. The lug 26 is fixed to the exterior of the casing 503 of the second connector by means of a support 27 so as to be engaged in a guide groove formed in the ring 25. Preferably, the lug 26 is arranged so as to cooperate with the external diameter of the ring 25, so as not to interfere with the sealed assembly of the sleeve 513 with the other connector 502.

As visible in FIG. 8, the ring 25 comprises a groove 19 passing through the thickness of the wall of the ring 25. The groove 19 is sufficiently wide for the lug 26 to be able to be inserted and displaced along the groove 19. The groove 19 comprises a series of alternate translation sections 20 and blocking sections 21.

The translation sections 20 extend parallel to the axis 6 of the casing 3 of the first connector 2. The blocking sections 21 extend in a circumferential direction of the casing 3. The groove 19 comprises an opening 22 located on a portion of the ring 25. During the connection of two connectors 2, the lug 26 is inserted into the groove 19 via the opening 22. The passage from one connected state to another is possible when the lug 26 is located in a translation section 20. A relative displacement of the connectors 2 thus results in a translation of the lug 26 along a translation section 20. Similarly, the blocking in a connected state of the connectors is possible when the lug 26 is located in a blocking section 21. The blocking in position of the connectors is carried out by a simple rotation of the ring 25 so as to displace the lug 26 along a blocking section 21 in order to offset the lug relative to the translation section 20. The groove 19 comprises in the extension of each translation section 20 a stop section 28. When the lug 26 is housed in one of these stop sections 28 it is not opposite a blocking section 21 and the rotation of the ring 25 is not possible. The stop section 28 constitutes a stable position for the lug 26, taking into account the restoring springs 10 and 11.

In a first embodiment, the ring 25 is fixed to the first connector. In this first embodiment, the rotation of the assembly formed by the first connector and the ring 25 relative to the second connector permits the displacement of the lug 26 in one of the blocking sections 21.

In a second embodiment, the ring 25 is pivotably mounted on the first connector. In this second rotational mode, the rotation of the ring 25 relative to the other connector permits the displacement of the lug 26 in the blocking sections 21. Alternatively, the support 27 of the lug 26 may be pivotably mounted on the connector which carries said lug.

In one embodiment, not shown, the translation sections extend in a direction which is not parallel to the axis of the casing. In this example, however, the translation sections each comprise a component in the direction of the movement of the connectors toward one another.

FIGS. 9 to 11 show variants of the connectors in which the flushing gas inlet and the evacuation of gas and/or liquid are situated at different locations.

In FIG. 9, elements which are similar or identical to those of FIG. 1 bear the same reference numeral increased by 200. FIG. 9 shows a variant in which the inlet conduit 217 and the evacuation conduit 218 both discharge into the same buffer space 216.

In FIG. 10, elements which are similar or identical to those of FIG. 1 bear the same reference numeral increased by 300. The variant shown in FIG. 10 also comprises an inlet conduit 317 and an evacuation conduit mounted on the first connector. The evacuation conduit is in two parts. A first part 318 successively passes through the fixed stud 312, the second flap valve 307, the second activation rod 309, the first flap valve 307 and the first activation rod 308 of the first connector 302 and discharges at the end of the rod 308 of the first connector opposite the rod 308 of the second connector. The second part 322 of the evacuation conduit is located in the second connector 302 and discharges, on the one hand, at the end of the rod 308 opposite the rod 308 of the first connector and, on the other hand, on a lateral wall 323 of the second activation rod 309. In the intermediate connected state of the connectors 302, the contact between the rods 308 of the two connectors 302 permits the connection between the part 322 of the second connector and the part 318 of the first connector.

In FIG. 11, elements which are similar or identical to those of FIG. 1 bear the same reference numeral increased by 300. In the variant of FIG. 11, the evacuation conduit 418 is housed inside or on the sleeve 413 providing the seal between the connectors. The casing 403 of the second connector 402 comprises an orifice which discharges into the buffer space 416. Thus, when the sleeve 413 surrounds the second connector, the evacuation conduit 418 communicates with the buffer space 416 of the second connector via the orifice of the second connector.

The casings 3 of the connectors 2 are not necessarily straight. Thus, FIG. 13 shows an embodiment in which a casing 503 is angled. For the remainder of the embodiment, the operation of the connectors 502 is identical to the embodiment of FIGS. 1 to 7.

An advantage of the connectors described above is the automatic mechanical control of the state of the second valve with the state of the first valve by the activation rod 9. More specifically, in the absence of external access to the second valve, the only way of switching into the open state is to switch the first valve into the maximum open state, which is obtained in the fully connected state described above. Thus, the opening of the second valve is only normally carried out in the coupled state of the connectors.

In contrast, the automatic mechanical control by means of the activation rod 9 and restoring springs 10 and 11 ensures that the closure of the first valve forcibly causes the closure of the second valve. Thus, the decoupling of the connectors forcibly causes the closure of the two valves which guarantees effective operating safety of the connectors.

The person skilled in the art will realize that these automatic mechanical controls may be obtained by other connecting means, causing the flap valves to cooperate with one another.

Moreover, the existence of the intermediate connected state, permitting an opening of the first valves without opening the second valves, has the advantage of being able to create a buffer of inert gas or any other suitable product in each connector before disconnection. Thus it permits the connecting space between the first valves to be flushed with any appropriate product during the connection of the connectors, so as to guarantee that the product contained in the pipelines 1 does not come into contact with the ambient air.

The existence of the pre-connected state, in which a sealed connection is implemented between the connectors before the first valves are even opened, provides the advantage of avoiding any direct communication of the buffer spaces with the ambient atmosphere. In one variant, the pre-connected state may be dispensed with.

Figure 14:
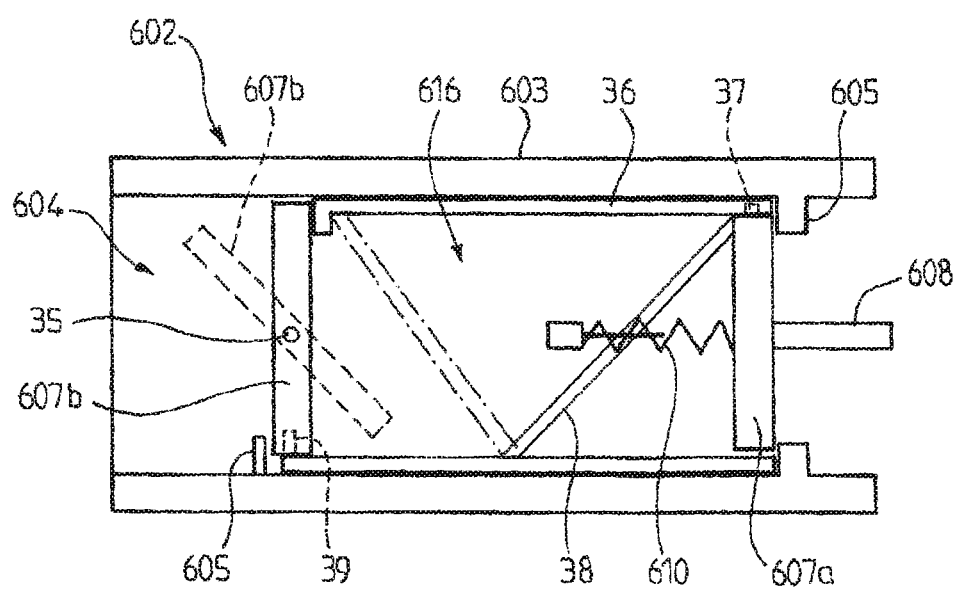
FIG. 14 is a schematic sectional view of a connector according to a further embodiment.

With reference to FIG. 14, a connector 602 having a slightly different operation from before will now be described. In FIG. 14, elements which are similar or identical to those in FIG. 1 bear the same reference numeral increased by 600.

In the embodiment of FIG. 14, the automatic mechanical control between the second valve and the first valve is less restrictive than before. More specifically, a locking device of the second valve is inserted in the connector 602 and the state of the first valve no longer automatically controls the state of the second valve itself but the state of the locking device of the second valve.

As above, the first valve comprises a flap valve 607a movably mounted in translation against a restoring spring 610 and returned to a closed state in which it cooperates with the flap valve seat 605. In contrast, here the second valve is a rotary valve 607b shown in dashed lines in the open state and solid lines in the closed state. The rotary valve 607b is fixed to an axle rod 35 pivotably mounted through the casing 603 and diametrically passing therethrough. The axle rod 35 protrudes outside the casing 603 to permit the rotary valve 607b to be rotated selectively into the open state and the closed state, for example manually or via an actuating motor. Thus, the switching of the rotary valve 607b is not driven automatically by the switching of the flap valve 607a in this case.

The locking device of the second valve comprises a ring 36 pivotably mounted in the buffer space 616 of the pipeline 604 with no degree of freedom in translation. The ring 36 bears on its internal surface a helicoidal groove 38, a pin 37 fixed to the flap valve 607a being engaged therein. The cooperation of the pin 37 with the groove 38 automatically controls the displacement in translation of the flap valve 607a with a rotary movement of the ring 36. The ring 36 is thus driven in rotation, as a function of the position of the flap valve 607a between:
  a locked position corresponding to the closed position of the flap valve 607a shown in FIG. 14, and
  an unlocked position corresponding to the open position of the flap valve 607a, not shown.

In the locked position, the ring 36 locks the rotary valve 607b in the closed state shown in FIG. 14. The rotary valve 607b is then not able to be opened by acting on the axle rod 35. This locking is achieved, for example, by means of a bolt 39 which is carried by the ring 36 and which protrudes radially toward the interior to engage in a striker produced in the form of a groove configured in the peripheral surface of the rotary valve 607b.

In the unlocked position, the bolt 39 of the ring 36 is located perpendicular to an inlet opening of the associated striker which releases the displacements of the rotary valve 607b. The rotary valve 607b is thus not able to be freely opened and closed by acting on the axle rod 35.

Due to these features, the only way of switching the rotary valve 607b into the open state is firstly to switch the first valve into the open state which is obtained in the connected state of the connectors 602 as in the embodiments described above. Thus the opening of the second valve only normally takes place in the coupled state of the connectors.

In this embodiment, the decoupling of the connectors forcibly causes the closure of the first valve and the locking of the second valve, which should have been closed previously by means of the axle rod 35. A high operational reliability of the connectors is also achieved in this case, since the operator follows the anticipated procedure.

The person skilled in the art will realize that these automatic mechanical controls may be obtained by other connecting means, causing the valves to cooperate with one another.

Finally the inlet and evacuation pipes may be provided in this embodiment in a similar manner to before.

The connection devices described above may be used in different applications where LNG conduits are used, for example to fill or empty an LNG tank in a land-based installation or offshore structure, such as an LNG carrier or the like.

Figure 12:
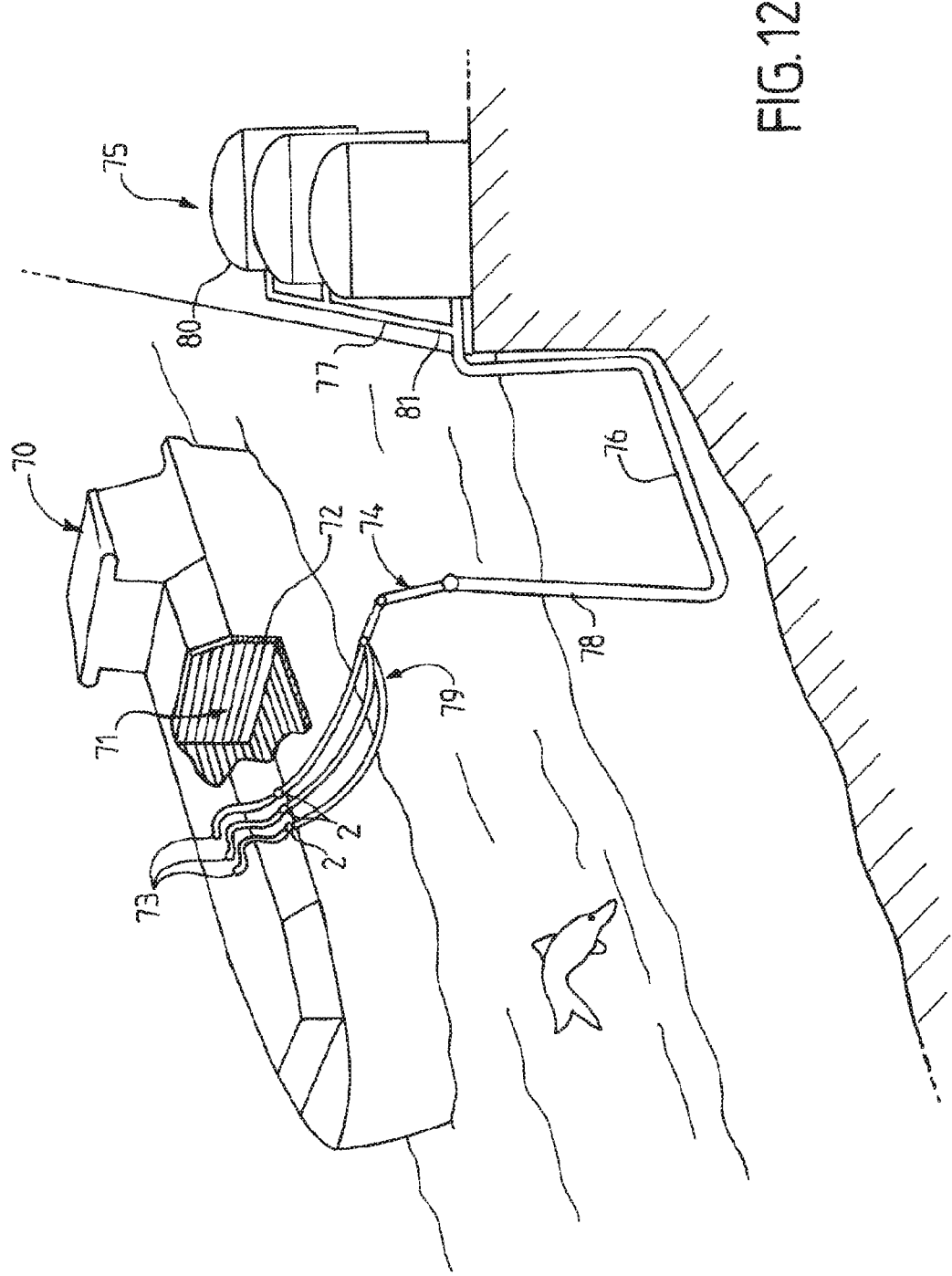
FIG. 12 is a schematic cut-away view of a tank of an LNG carrier and a supply/discharge terminal of this tank connected by flexible pipes comprising connectors of the connection device according to FIGS. 1 to 8.

With reference to FIG. 12, a cut-away view of an LNG carrier 70 shows a sealed and insulated tank 71 of generally prismatic shape mounted in the double hull 72 of the marine vessel. Supply/discharge pipelines 73 arranged on the upper bridge of the marine vessel may be attached by means of connectors 2 as described above to a marine or harbor terminal to transfer a cargo of LNG from or to the tank 71.

FIG. 12 shows an example of a marine terminal comprising a supply and discharge station 75, an underwater conduit 76 and a land-based installation 77. The supply and discharge station 75 is a fixed offshore installation comprising a mobile arm 74 and a tower 78 which supports the mobile arm 74. The mobile arm 74 carries a bundle of insulated flexible pipes 79 which are able to be connected to the supply/discharge pipelines 73. The mobile arm 74, which is able to be oriented, is suitable for all types of LNG carrier. A connecting pipe, not shown, extends inside the tower 78. The supply and discharge station 75 permits the supply and discharge of the LNG carrier 70 from or to the land-based installation 77. Said land-based installation comprises tanks for storing liquefied gas 80 and connecting pipes 81 connected by the underwater conduit 76 to the supply or discharge station 75. The underwater conduit 76 permits the transfer of liquefied gas between the supply or discharge station 75 and the land-based installation 77 over a long distance, for example 5 km, which permits the LNG carrier 70 to be kept at a long distance from the coast during supply and discharge operations.

To create the necessary pressure for the transfer of the liquefied gas, pumps mounted on-board the marine vessel 70 and/or pumps provided at the land-based installation 77 and/or pumps provided at the supply and discharge station 75 are used.

Although the invention has been described in connection with several particular embodiments, it is obvious that it is not limited thereby in any respect and it comprises all the technical equivalents of the means disclosed, in addition to combinations thereof if they fall within the scope of the invention.

Thus, the gas inlet conduit and the gas and/or liquid evacuation conduit may discharge into one or other of the buffer spaces of the connectors, or even into the connecting space therebetween. The blocking mechanism may take any other suitable form, for example a screw-nut system. Similarly, the connectors described above within the scope of the transfer of LNG are applicable to the transfer of any fluid requiring a greater level of security.

The use of the verbs "to consist of", "to comprise" or "to include" and their conjugated forms does not exclude the presence of other elements or other steps from those cited in a claim. The use of the indefinite article "a" or "an" for an element or a step does not exclude, unless indicated to the contrary, the presence of a plurality of such elements or steps.

In the claims, any reference between parentheses should not be interpreted as a limitation to the claim.

The invention claimed is:

1. A connection device for connecting two fluid circuits, the connection device comprising a first connector (2, 502, 602) designed to be mounted on a first fluid circuit (1) and a second connector (2, 502, 602) designed to be mounted on a second fluid circuit (1), wherein each of the first connector and second connector comprises:
   a fluid conduit (4, 504, 604) having a longitudinal axis (6) and having a first end designed to be mounted on a corresponding one of the first fluid circuit and the second fluid circuit, and a second end designed to cooperate with the second end of the fluid conduit of the other connector, the second end of the fluid conduit of one of the first connector and the second connector being inserted and guided in translation along a translation direction by the second end of the fluid conduit of the other of the first connector and the second connector during said translation, said translation direction being coaxial with both the longitudinal axis (6) of the first connector and the longitudinal axis (6) of the second connector, so as to form a fluid passage between the first connector and the second connector,
   a first valve (7, 307, 507, 607a) located in the fluid conduit and capable of selectively sealing or opening an internal space of the fluid conduit,
   a second valve (7, 307, 507, 607b) located in the fluid conduit between the first valve and the first end of the connector and capable of selectively sealing or opening the internal space of the fluid conduit,
   wherein the internal space of the fluid conduit comprises a buffer space (16, 216, 316, 416) defined by an inner wall of the fluid conduit, the first valve and the second valve,
   a first actuator (8, 308, 508, 608) capable of actuating the first valve between an open position opening the conduit and a closed position sealing the fluid conduit in a sealed manner,
   a second actuator (9, 309, 509, 35) capable of actuating the second valve between an open position opening the conduit and a closed position sealing the fluid conduit in a sealed manner,
the connection device further comprising
   a coupling element (13, 213, 313, 413, 513) capable of sealingly coupling the two connectors in a coupled position, such that the internal spaces of the fluid conduits of the two connectors are sealingly connected in the region of the second ends of the fluid conduits, and form, between the first valves of the two connectors, an inter-connector space (15, 215) which is sealed relative to the outside of the fluid conduits, the longitudinal axis (6) of the first connector and the longitudinal axis (6) of the second connector being coaxial in said coupling position,
   a blocking mechanism compromising a sleeve (25) with a groove in it, and a lug which engages the groove to connect the first connector and the second connector, said blocking mechanism being capable of blocking and enabling relative translation along a translation direction of the connectors (2, 502), in a plurality of distinct positions of the connectors along the translation direction, the fluid conduits (4, 504) being sealingly connected to one another in said plurality of positions, said plurality of positions comprising a fully connected position and an intermediate connected position, the intermediate connected position being located along the translation direction between a disconnected position and the fully connected position, the disconnected position corresponding to a position in which the second end of the first connector and the second end of the second connector are unconnected and the longitudinal axis (6) of the fluid conduit of the first connector and the longitudinal axis (6) of the fluid conductor of the second connector are coaxial, both the first valve and the second valve of each connector being closed in said disconnected position, wherein the first actuator actuates the first valve according to the plurality of positions of the connectors and the second actuator actuates the second valve according to the plurality of positions of the connectors, so that:

in the fully connected position the first valves of each connector are opened by the first actuators and the second valves of each connector are opened by the second actuators, and in the intermediate connected position:

the first valves (7, 507) of each connector are opened by the first actuators such that the buffer spaces (16) of the two connectors are in communication with the inter-connector space (15), and the second valves (7, 507) of each connector are maintained in a closed state by the second actuators and seal the fluid conduits and wherein one of the connectors comprises a flushing gas inlet (17, 217, 317, 417) discharging into the buffer space between the second valve and the second end of the conduit and designed to be connected to a source for supplying flushing gas and capable of injecting flushing gas into the buffer space (16, 216, 316, 416) of the connector and/or the inter-connector space (15, 215) so that flushing gas injected into the buffer space (16, 216, 316, 416) of the connector and/or the inter-connector space (15, 215) remains in the buffer spaces of the connectors and in the inter-connector space in the immediate connected position of the connectors, and one of the connectors comprises a gas and/or liquid outlet (18, 218, 318, 418) discharging into the internal space between the second valve and the second end of the conduit and capable of evacuating the gas and/or the liquid contained in the buffer space (16, 216, 316, 416) of said connector and/or the inter-connector space (15, 215) so that the gas and/or the liquid contained in the buffer spaces (16, 216, 316, 416) of the connectors and the inter-connector space (15, 215) can be evacuated from the buffer spaces of the connectors and the inter-connector space in the intermediate connected position.

2. The connection device as claimed in claim 1, wherein the flushing gas inlet and the gas and/or liquid outlet are located on one and the same of the first and second connectors.

3. The connection device as claimed in claim 1, wherein the flushing gas inlet and the gas and/or liquid outlet are separately located on one and the other of the first and second connectors.

4. The connection device as claimed in claim 1, the second actuator (9, 309) being configured for mechanically controlling a closed state of the second valve in response to a closed state of the first valve and for mechanically controlling an open state of the second valve in response to an open state of the first valve when the connectors are in the fully connected position.

5. The connection device as claimed in claim 1, wherein the first valve of each connector comprises:

a first valve seat (5, 605) fixed in the internal space of the fluid conduit, a first flap valve (7, 607a) which is mobile in translation in the direction of the fluid conduit relative to the first flap valve seat and designed to cooperate with the first flap valve seat on the side of the second end of the conduit in order to seal the fluid conduit of the connector in a sealed manner, a first restoring element (10, 610) capable of exerting a first restoring force pushing back the first flap valve against the first flap valve seat in the direction of the second end of the conduit in the absence of opposing force, and wherein the first actuator of each connector comprises a first activation rod (8, 308, 508, 608) protruding from one face of the first flap valve opposing the buffer space, the first activation rods (8, 308, 508, 608) of the two connectors being designed to cooperate in abutment when the connectors are moved toward one another so as to block the movement of the first flap valves toward one another without preventing the movement of the connectors toward one another, this blockage of the movement of the first flap valves toward one another being carried out counter to the first restoring force of each first flap valve, such that in the coupled states of the two connectors, the abutment of the first activation rods maintains the first flap valves at a distance from the first flap valve seats.

6. The connection device as claimed in claim 5, wherein the second valve of each connector comprises:

a second flap valve seat (5) fixed in the internal space of the fluid conduit between the first flap valve seat and the first end of the fluid conduit, a second flap valve (7, 307, 507) which is mobile in translation in a direction of the conduit relative to the second flap valve seat and designed to cooperate with the second flap valve seat on the side of the second end of the conduit in order to seal the fluid conduit in a sealed manner, a second restoring element (11) capable of exerting on the second flap valve a second restoring force pushing back the second flap valve against the second flap valve seat in the direction of the second end of the conduit in the absence of opposing force, and the second actuator of each connector comprises a second activation rod (9, 309, 509) extending between the first flap valve and the second flap valve, the second activation rod of each connector being designed to transmit the displacement of the first flap valve to the second flap valve in order to push back the second flap valve against the second restoring force of the second flap valve in response to the displacement of the first flap valve when the two connectors are moved toward one another in order to couple said connectors, such that in a fully connected position of the two connectors, the thrust of the second activation rods (9, 309, 509) on an internal face of the second flap valves opposite the first flap valves maintains the second flap valves at a distance from the second flap valve seats.

7. The connection device as claimed in claim 6, wherein the blocking mechanism (25, 26) is also capable of blocking the relative translation of the connectors in a pre-connected position located along the translation direction between the disconnected position and the intermediate connected position, the pre-connected position being characterized in that the connectors are sealingly connected to one another and the first and second valves of each connector are closed.

8. The connection device as claimed in claim 7, wherein the blocking mechanism for blocking the relative translation of the connectors comprises:
a cylindrical ring (25) mounted on the conduit of the first connector, the ring being provided with a groove (19),
a lug (26) which is complementary to the groove, fixed to the second connector,
and wherein the groove comprises:
an insertion section (20), one first end thereof forming an opening of the groove on a portion of the ring, the opening of the groove being designed to receive the lug, the insertion section extending in a direction which is not transverse to the direction of the fluid conduit of the first connector,
a first blocking section (21) extending in a circumferential direction of the fluid conduit of the first connector from the insertion section, the first blocking section being designed to block the movement in translation of the connectors toward one another in the pre-connected position,
a first connecting section (20) extending in a direction which is not transverse to the direction of the fluid conduit of the first connector from the first blocking section,
a second blocking section (21) extending in a circumferential direction of the fluid conduit of the first connector from the first connecting section, the second blocking section being designed to block the movement in translation of the connectors toward one another in the intermediate connected position,
a second connecting section (20) extending in a direction which is not transverse to the direction of the fluid conduit of the first connector from the second blocking section,
a coupling section (21) extending in a circumferential direction of the fluid conduit of the first connector from the second connecting section, the coupling section being designed to block the connectors in a fully connected coupled position.

9. A transfer system for a fluid product, the system comprising a marine vessel (70), a first pipeline (73) and a second pipeline (79) connected together by a connection device (2) as claimed in claim 1, the pipelines being arranged so as to connect a tank (71) installed in a hull of the marine vessel to an offshore or land-based storage installation (75).

10. The connection device as claimed in claim 1, to connect two pipelines (1), each comprising a connector (2, 502, 602) of the connection device, wherein:
the two fluid conduits are coupled in a coupled position in which the internal spaces of the fluid conduits of the two connectors are connected in the region of the second ends of the fluid conduits so as to form a sealed passage between the fluid conduits of the two connectors,
the first valve of the first connector is opened so as to open the internal space of the fluid conduit of the first connector,
the first valve of the second connector is opened so as to open the internal space of the fluid conduit of the second connector,
the second valve of the first connector is opened so as to open the internal space of the fluid conduit of the first connector,
the second valve of the second connector is opened to as to open the internal space of the fluid conduit of the second connector;
further comprising, between the opening of the first valves of the two connectors and the opening of the second valves of the two connectors:
the opening of the flushing gas inlet (17, 217, 317, 417);
the opening of the gas and/or liquid outlet (18, 218, 318, 418);
the injection of flushing gas into the buffer spaces of the two connectors and into the inter-connector space via the flushing gas inlet,
the simultaneous evacuation of the gas contained in the buffer spaces of the two connectors and in the inter-connector space via the outlet so as to fill the flushing gas into the entire space between the second valves.

11. The connection device as claimed in claim 1, for disconnecting two pipelines, each comprising a connector of the connection device, wherein:
the second valve of a first connector is closed in order to seal the fluid conduit of the first connector,
the second valve of a second connector is closed in order to seal the fluid conduit of the second connector,
the first valve of the first connector is closed in order to seal the fluid conduit of the first connector,
the first valve of the second connector is closed in order to seal the fluid conduit of the second connector,
the second ends of the fluid conduits are separated;
further comprising, between the closure of the first valves of the two connectors and the separation of the second ends of the fluid conduits of the two connectors:
the opening of the flushing gas inlet (17, 217, 317, 417);
the opening of the gas and/or liquid outlet (18, 218, 318, 418);
the injection of flushing gas into the buffer spaces of the two connectors and into the inter-connector space via the flushing gas inlet,
the simultaneous evacuation of gas contained in the buffer spaces of the two connectors and in the inter-connector space via the gas outlet so as to fill flushing gas into the entire space between the second valves.

12. A connection device for connecting two fluid circuits, the connection device comprising a first connector (2, 502, 602) designed to be mounted on a first fluid circuit (1) and a second connector (2, 502, 602) designed to be mounted on a second fluid circuit (1), wherein each of the first connector and second connector comprises:
a fluid conduit (4, 504, 604) having a longitudinal axis (6) and having a first end designed to be mounted on a corresponding one of the first fluid circuit and the second fluid circuit, and a second end designed to cooperate with the second end of the fluid conduit of the other connector, the second end of the fluid conduit of one of the first connector and the second connector being inserted and guided in translation along a translation direction by the second end of the fluid conduit of the other of the first connector and the second connector during said translation, said translation direction being coaxial with both the longitudinal axis (6) of the first connector and the longitudinal axis (6) of the second connector, so as to form a fluid passage between the first connector and the second connector, a first valve (7, 307, 507, 607a) located in the fluid conduit and capable of selectively sealing or opening an internal space of the fluid conduit, a second valve (7, 307, 507, 607b) located in the fluid conduit between the first valve and the first end of the connector and capable of selectively sealing or opening the internal space of the fluid conduit, wherein the internal space of the fluid conduit comprises a buffer space (16, 216, 316, 416) defined by an inner wall of the fluid conduit, the first valve and the second valve, a first actuator (8, 308, 508, 608) capable of actuating the first valve between an open position opening the conduit and a closed position sealing the fluid conduit in a sealed manner, a second actuator (9, 309, 509, 35) capable of actuating the second valve between an open position opening the conduit and a closed position sealing the fluid conduit in a sealed manner, the connection device further comprising a coupling element (13, 213, 313, 413, 513) capable of sealingly coupling the two connectors in a coupled position, such that the internal spaces of the fluid conduits of the two connectors are sealingly connected in the region of the second ends of the fluid conduits and form, between the first valves of the two connectors, an inter-connector space (15, 215) which is sealed relative to the outside of the fluid conduits, the longitudinal axis (6) of the first connector and the longitudinal axis (6) of the second connector being coaxial in said coupling position, a blocking mechanism comprising a screw-nut system, said blocking mechanism being capable of blocking and enabling relative translation along a translation direction of the connectors (2, 502) in a plurality of distinct positions of the connectors along the translation direction, the fluid conduits (4, 504) being sealingly connected to one another in said plurality of positions, said plurality of positions comprising a fully connected position and an intermediate connected position, the intermediate connected position being located along the translation direction between a disconnected position and the fully connected position, the disconnected position corresponding to a position in which the second end of the first connector and the second end of the second connector are unconnected and the longitudinal axis (6) of the fluid conduit of the first connector and the longitudinal axis (6) of fluid conduit of the second connector are coaxial, both the first valve and the second valve of each connector being closed in said disconnected position, wherein the first actuator actuates the first valve according to the plurality of positions of the connectors and the second actuator actuates the second valve according to the plurality of positions of the connectors, so that:

1. in the fully connected position the first valves of each connector are opened by the first actuators and the second valves of each connector are opened by the second actuators, and 2. in the intermediate connected position:
   a. the first valves (7, 507) of each connector are opened by the first actuators such that the buffer spaces (16) of the two connectors are in communication with the inter-connector space (15), and
   b. the second valves (7, 507) of each connector are maintained in a closed state by the second actuators and seal the fluid conduits and wherein one of the connectors comprises a flushing gas inlet (17, 217, 317, 417) discharging into the buffer space between the second valve and the second end of the conduit and designed to be connected to a source for supplying flushing gas and capable of injecting flushing gas into the buffer space (16, 216, 316, 416) of the connector and/or the inter-connector space (15, 215) so that flushing gas injected into the buffer space (16, 216, 316, 416) of the connector and/or the inter-connector space (15, 215) remains in the buffer spaces of the connectors and in the inter-connector space in the intermediate connected position of the connectors, and one of the connectors comprises a gas and/or liquid outlet (18, 218, 318, 418) discharging into the internal space between the second valve and the second end of the conduit and capable of evacuating the gas and/or the liquid contained in the buffer space (16, 216, 316, 416) of said connector and/or the inter-connector space (15, 215) so that the gas and/or the liquid contained in the buffer spaces (16, 216, 316, 416) of the connectors and the inter-connector space (15, 215) can be evacuated from the buffer spaces of the connectors and the inter-connector space in the intermediate connected position.

* * * * *